United States Patent
Dieberger et al.

(10) Patent No.: US 7,143,362 B2
(45) Date of Patent: Nov. 28, 2006

(54) SYSTEM AND METHOD FOR VISUALIZING AND NAVIGATING CONTENT IN A GRAPHICAL USER INTERFACE

(75) Inventors: Andreas Dieberger, San Jose, CA (US); Dulce Beatriz Ponceleon, Palo Alto, CA (US); Daniel Martin Russell, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 10/034,300

(22) Filed: Dec. 28, 2001

(65) Prior Publication Data

US 2003/0122873 A1   Jul. 3, 2003

(51) Int. Cl.
    *G06F 3/00* (2006.01)
(52) U.S. Cl. .................. 715/764; 715/707; 715/715; 715/723; 715/712; 715/768
(58) Field of Classification Search ............... 715/853, 715/854, 855, 721, 787, 713, 723, 786, 764, 715/712, 758, 711, 715, 707
    See application file for complete search history.

(56) References Cited

U.S. PATENT DOCUMENTS

| | | | | |
|---|---|---|---|---|
| 5,521,841 | A | 5/1996 | Arman et al. | 364/514 A |
| 5,636,350 | A * | 6/1997 | Eick et al. | 345/440 |
| 5,708,767 | A | 1/1998 | Yeo et al. | 395/140 |
| 5,821,945 | A | 10/1998 | Yeo et al. | 345/440 |
| 5,852,435 | A | 12/1998 | Vigneaux et al. | 345/302 |
| 5,862,325 | A | 1/1999 | Reed et al. | 395/200.31 |
| 5,944,783 | A | 8/1999 | Nieten | 709/202 |
| 5,966,139 | A * | 10/1999 | Anupam et al. | 345/440 |
| 6,061,062 | A * | 5/2000 | Venolia | 715/856 |
| 6,094,648 | A * | 7/2000 | Aalbersberg | 707/3 |
| 6,119,101 | A | 9/2000 | Peckover | 705/26 |
| 6,166,735 | A | 12/2000 | Dom et al. | 345/339 |
| 6,181,336 | B1 | 1/2001 | Chiu et al. | 345/329 |
| 6,181,342 | B1 | 1/2001 | Niblack | 345/356 |
| 6,353,448 | B1 * | 3/2002 | Scarborough et al. | 715/744 |
| 6,356,285 | B1 * | 3/2002 | Burkwald et al. | 715/853 |
| 6,483,523 | B1 * | 11/2002 | Feng | 715/745 |
| 6,486,896 | B1 * | 11/2002 | Ubillos | 715/784 |

(Continued)

FOREIGN PATENT DOCUMENTS

WO   WO 0063837   10/2000

OTHER PUBLICATIONS

WinNT, Microsoft Windows NT screenshots, 1998, p. 1.*

(Continued)

*Primary Examiner*—Kristine Kincaid
*Assistant Examiner*—Ryan Pitaro
(74) *Attorney, Agent, or Firm*—Marc D. McSwain (57) ABSTRACT

A system and method for visualizing and navigating document content using a condensed representation of a document to provide both a global overview of the distribution of key search terms as well as their immediate context. The invention supports rapid skimming of documents and document collections and enables efficient information finding, in some cases entirely eliminating the need to scroll within a document as with a conventional browser tool. The invention is of particular utility with personal digital assistants, which generally have small displays and limited storage capacity and communication bandwidth in comparison to personal computers. Documents may include conventional text and image files, web pages, audio files, and video files. The invention may also apply to collections of documents.

2 Claims, 10 Drawing Sheets

U.S. PATENT DOCUMENTS

| | | | |
|---|---|---|---|
| 6,580,437 B1* | 6/2003 | Liou et al. | 715/719 |
| 6,615,209 B1* | 9/2003 | Gomes et al. | 707/5 |
| 6,816,174 B1* | 11/2004 | Tiongson et al. | 715/787 |
| 6,883,138 B1* | 4/2005 | Rosenholtz et al. | 715/526 |
| 6,912,327 B1* | 6/2005 | Hori et al. | 382/305 |
| 6,996,782 B1* | 2/2006 | Parker et al. | 715/764 |
| 2001/0021268 A1* | 9/2001 | Jun et al. | 382/165 |
| 2002/0067380 A1* | 6/2002 | Graham | 345/838 |
| 2002/0129051 A1* | 9/2002 | Abdelhadi et al. | 707/501.1 |
| 2002/0163545 A1* | 11/2002 | Hii | 345/838 |
| 2002/0198875 A1* | 12/2002 | Masters | 707/4 |
| 2003/0146939 A1* | 8/2003 | Petropoulos et al. | 345/810 |
| 2004/0205514 A1* | 10/2004 | Sommerer et al. | 715/501.1 |
| 2005/0154637 A1* | 7/2005 | Nair et al. | 705/14 |

OTHER PUBLICATIONS

Berkley Digital Library Project, TileBars, May 21, 1998, p. 1-5.*

North, Chris, User Controlled Overviews of an Image Library: A Case Study of the Visible Human, 1996, pp. 1-10.*

Hearst, Marti A., "Tile Bars: Visualization of Term Distribution Information in Full Text Information Access", Proceedings of the ACM SIGCHI Conference on Human Factors in Computing Systems, p. 59-66, Denver, CO, May 1995. Also available at: www.acm.org/pubs/articles/proceedings/chi/223904/p59-hearst.html.

Card, S. K., Mackinlay, J.D., et al., Eds. (1999). Readings in Information Visualization—Using Visi n to Think. San Francisco, CA, Morgan Kaufmann, p. 58-59.

Eick, S. G., Steffen, J.L., et al. (1999). Seesoft—A Tool For Visualizing Line Oriented Software Statistics. Readings in Information Visualization. San Francisco, CA, Morgan Kauffman, p. 419-430.

Baeza-Yates, R., Ribeiro-Neto, B. Modern Information Retrieval, ACM Press, New York, p. 291-293.

McCorman, Jenifer S., Wohlschlaeger, Brian, "Harnessing Agent Technologies for Data Mining and Knowledge Discovery", in Data Mining and Knowledge Discovery: Theory, Tools, and Technology II, Belur V. Dasarathy, Editor, Proceedings of SPIE, v. 4057 (2000), p. 393-400.

Ponceleon, D. and Dieberger, A. "Hierarchical Brushing In A Collection Of Video Data", Proceedings of the 34$^{th}$ Annual Hawaii International Conference on System Sciences, HICSS 34, Maui, HI, USA, Jan. 3-6, 2001.

"Cue Video", www.almaden.ibm.com/cs/cuevideo/index.html.

Woodruff, A. et al., "Enhancing a Digital Book with a Reading Recommender", CHI'2000 Letters, vol. 2, issue 1, Apr. 1-6, 2000, p. 153-160 + 580.

Fan, Y. and Gauch, S., "Adaptive Agents for Information Gathering from Multiple, Distributed Information Sources", Intelligent Agents in Cyberspace, Papers from the 1999 AAAI Symposium, p. xiii+197, 40-46.

Srinivasan, S. et al., "What is in that video anyway?: in search of better browsing", IEEE International Conference on Multimedia and Computing Systems, vol. 1, 1999, p. 388-393.

Pirolli, P. and Card, S., "Informati n foraging in information access environment", Human Factors in C mputing Systems, CHI'95 Conference Proceedings, 1995, p. 51-58.

* cited by examiner

- <u>Work</u>
    - Spatial Metaphors for information spaces
    - Social Navigation
    - <u>Social Navigation Swiki</u> *ated: 5/2000*
- <u>Private</u> *updated: 3/2000*

FIG. 6B

- <u>Work</u>
    - Spatial Metaphors for informa___ spaces
    - Social Navigation
    - <u>Social Navigation Swiki</u> ___ 5/2000
- <u>Private</u> *updated: 3/2000*

FIG. 6C

- <u>Work</u>
    - Spatial Metaphors for informa___
    - Social Navigation
    - <u>Social Navigation Swiki</u> ___
- <u>Private</u> *updated: 3/2000*

SYSTEM AND METHOD FOR VISUALIZING AND NAVIGATING CONTENT IN A GRAPHICAL USER INTERFACE

DESCRIPTION OF RELATED APPLICATIONS

This application is related to two other commonly owned and concurrently filed applications, "System and Method for Visualizing and Navigating Dynamic Content in a Graphical User Interface" Ser. No. 10/034,499 and "Navigation Tool for Slide Presentations" Ser. No. 10/034,149, which are incorporated herein by reference.

FIELD OF THE INVENTION

This invention relates to graphical user interfaces and more specifically to a system and method for visualizing and navigating content in a graphical user interface without requiring the use of conventional scrolling techniques in a web browser.

DESCRIPTION OF RELATED ART

As the volume of data accessible via computer continues to increase, the need for automated tools for efficient retrieval of relevant information from that data also increases. Many people use the Internet to access a wide variety of documents represented in many different formats, such as plain text, static images, animations, HTML-based web pages, MP3 audio, and video data. Specific information is very often found by the user through queries to search engines, which are remotely accessible programs that perform keyword or similarity searches for information on Internet data.

Search engines typically return dozens or hundreds of URLs (universal resource locators, which are essentially web site addresses) that the search engines have determined are related to user-specified keywords or search phrases. Many search engines return the first sentence or the first n characters found at a given URL, or a snippet of text around the location of the found keyword, to help the user determine whether that URL is actually of interest. Some search engines also provide a relevance ranking, which is a relative numerical estimate of the statistical likelihood that the material at a given URL will be of interest in comparison to other documents. Relevance rankings are generally based on the number of times a keyword or search phrase appears in a document, its placement in the document (for example, a keyword in the title is often deemed more relevant than one at the end of the page), and the size of the document.

A user generally needs a web browser to explore a URL suggested by a search engine to determine whether the URL's content is actually interesting. A web browser is a software application used to locate and display web pages. Conventional web browsers include Netscape Navigator® by Netscape Communications Corporation of Mountain View, Calif., and Internet Explorer® by Microsoft Corporation of Redmond, Wash., among others. The user often selects a given URL either by clicking on a hyperlink or by directly specifying a URL (e.g. http://www.ibm.com). The user then typically navigates around a given web site by scrolling inside web pages and activating links between pages with a mouse until interesting content is discovered.

Unfortunately, it is not always easy for a user to maintain context when navigating within a large web site or viewing a document; that is, the user may have difficulty keeping an overview of a document or collection of documents while focusing on detailed content. While scrolling through a document and trying to find interesting material, the user may get lost or forget what keyword or search phrase led to a particular URL or forget which previously-viewed document contained something interesting. This situation is exacerbated when the user is equipped with hardware that has limited communication bandwidth or limited display area and resolution, this is often the case with personal digital assistants (PDAs).

Figure 1:
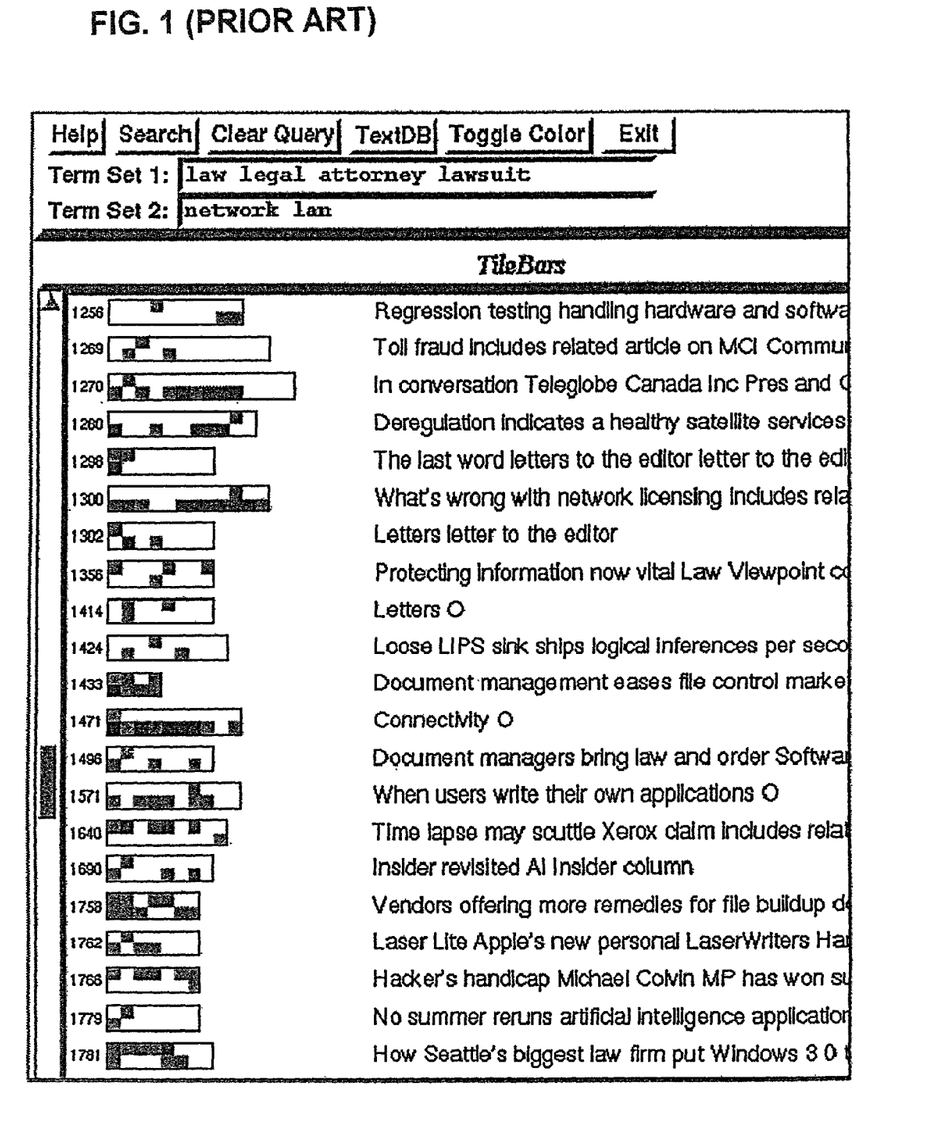
FIG. 1 is a display of the TileBars interface (prior art).

One attempt to remedy this problem is provided by Marti A. Hearst in "TileBars: Visualization of Term Distribution Information in Full Text Information Access", Proceedings of the ACM SIGCHI Conference on Human Factors in Computing Systems, p. 59–66, Denver, Colo., May 1995, which is hereby incorporated by reference. Hearst describes a rectangular array of square tiles depicted in a graphical user interface along with the typical output of a search engine, as shown in FIG. 1. Each array corresponds to a document found by the search engine. Each row of tiles in the array corresponds to a specified search term of interest (e.g. "law legal attorney lawsuit" and "network lan"). Each column in the array corresponds to a segment (e.g. different paragraphs) of the document, with the overall width of the array indicating the relative length of documents found by a search engine. The darkness of each tile indicates the relative number of occurrences of the search term in the corresponding document segment represented by the tile.

Another visualization tool known in the art is the Seesoft visualization system, described in "Seesoft—A Tool For Visualizing Line Oriented Software Statistics", by S. G. Eick et al., Readings in Information Visualization, Morgan Kauffman, San Francisco, Calif., 1999, p. 419–430, which is hereby incorporated by reference. In this system, computer source code files are depicted as columns, lines of code are depicted as thin rows, with color indicating which programmer modified which line of source code or how many times a given line was modified or and how much time has elapsed since a line was modified. Fold-out windows enable more detailed examination of the source code text. The Seesoft system also describes the use of mouse "brushing", wherein the mouse-controlled placement of a screen cursor near or over an entity within the graphical user interface triggers a display of additional information. A summary of the TileBars and Seesoft interfaces is given in Modem Information Retrieval by Ricardo Baeza-Yates and Berthier Ribeiro-Neto, ACM Press, p. 291–293, which is hereby incorporated by reference.

Use of video documents in a computer environment is rapidly advancing. There are unique problems faced by users when attempting to quickly visualize and navigate what are often very long spans of linear data that cannot be examined in a single glance. CueVideo is a research project of the IBM Corporation intended to address challenges arising in the automatic indexing, segmentation, and use of multimedia documents and collections. The CueVideo toolkit performs multimedia analysis and includes an indexing engine that computes (and saves on a server) indices, hyperlinks, and data for browsing documents. It also includes an interactive user interface for searching and browsing video files with conventional web browser applications and standard media plug-ins. CueVideo is well-described at www.almaden.ibm.com/cs/cuevideo/index.html and in "'What is in that video anyway':in search of better browsing", by S. Srinivasan, D. Ponceleon, A. Amir and D. Petkovic, IEEE International Conference on Multimedia Computing and Systems, volume 1, 1999, p. 388–393, which are hereby incorporated by reference.

While the aforementioned prior art tools are useful advances in the field of information visualization, GUI tools that provide further ease of use could be developed. Such tools would be of interest to Internet users who must currently sift and scroll through large collections of potentially immense documents, sometimes with hardware of limited display, storage, and communication capability. A system for providing concise document visualization and easy navigation while keeping the user within context is therefore needed.

SUMMARY OF THE INVENTION

It is accordingly an object of this invention to devise a system and method for concise visualization and easy navigation of documents while keeping the user within context. In a typical usage scenario, the user specifies keywords or search terms of interest, and a search engine provides links to a number of documents that it deems relevant. A document analysis and indexing tool may generate related document metadata.

The invention then provides an abstract representation or summary view of at least one of the documents. The summary view may be generated from the document itself or from the document metadata or both. The summary view depicts the structure of the documents as well as the distribution and frequency of interesting features including search terms within the documents' various segments as an exemplary indication of document relevance. The summary view may be generated by a Java applet.

In a first embodiment, the summary view comprises a rectangular array of cells in which the rows of the array correspond to the interesting features such as user-specified search terms, and the columns correspond to segments of the document. The content of each cell (for example, the color or darkness of each cell) represents the presence or absence of features, or the frequency with which features occur in the portion of the document represented by that particular cell. In the preferred embodiment, the summary view comprises a rectangular array of cells in which columns of the array correspond to the features and the rows correspond to segments of the document, i.e. the summary view is substantially vertically oriented to more intuitively correspond with the top and bottom of a document. The summary view thus provides an immediate overview of the document as well as the distribution of interesting features throughout the document as an exemplary indication of document relevance.

It is a related object that the invention provide such concise visualization and easy navigation means within a modified version of a document. Alternately, the means may be embodied as a fold-out window that appears to float above a displayed document.

It is a related object that different search terms or term categories be depicted with different colors in the summary view when feasible to help the user maintain the context of the information visualization and navigation experience. A legend of the search terms or term categories in the different colors may help prevent user confusion.

It is a related object that the summary view utilizes cursor "brushing", the juxtaposition of a cursor near or over a cell, to trigger an enhancement of the summary view providing more detailed information. For example, a contextual snippet of information including a particular search term and several surrounding words from the particular portion of a document represented by a cell can be displayed when a user moves the cursor over that cell.

It is a related object that the invention serves as an intermediary that enables intuitive visualization and navigation capabilities without causing distraction or confusion to users who are accustomed to conventional web browser use.

It is a related object that the improved visualization and navigation means may be of particular utility to users of computer systems having limited storage, display, and communication capability. This is often the case with PDAs, personal information managers (PIMs) and cellular phones or other platforms incorporating microbrowsers.

It is a related object that such visualization and navigation not rely on the use of conventional scrolling techniques as practiced with conventional web browsing programs, although the invention is intended to be used with web browsers. Users may use the summary view to determine the context in which features occur in a document, and in response choose to directly navigate to a particular occurrence of a feature in the document. When the user clicks on a particular cell, the invention responsively scrolls the document so that the portion of the document corresponding to the cell is displayed.

It is a related object that a hierarchy of summary views may be generated by the invention. Each summary view in the hierarchy depicts increasingly detailed summary information about portions of the document until finally a particular portion of the document is directly displayed.

It is a related object that the visualization and navigation system provide summary information about various features of documents that are linked to a document currently being displayed, without requiring that linked documents be prefetched in their entirety. This summary information may include thumbnails (low resolution versions) of other documents linked to the document currently being displayed, or indications of the presence and distribution of features in linked documents. The user may therefore choose whether to click on (and thus navigate to) a linked document based on the summary information. The summary information may also include a description of the number of accesses that have been made to the linked documents or portions thereof For example, the darkness of depicted cells may correspond to the popularity of a document portion.

It is a related object that the invention enable improved visualization and navigation of documents that include large amounts of linear data, i.e. documents that cannot be readily summarized at a single glance. Examples include long text files, audio files and video files. Collections of documents are additional examples. In a third embodiment, each row in a summary view corresponds to a section of the video data selected by a segmentation tool. For example, when a user brushes a cursor over a cell, the invention displays a video frame corresponding to the segment of video data represented by the cell and indicia of the correspondence. When the user clicks on a cell or video frame, the invention navigates to the corresponding segment in the video data and begins playing the video in the display at the beginning of the selected segment. For video collections, the first hierarchical fold-out window may represent a plurality of videos, with subsequent fold-out windows in the hierarchy representing individual videos, and then segments of individual videos and so forth to a point where the video itself begins playing in the display. Alternately, in a fourth embodiment, the invention may display a storyboard comprising a plurality of video frames, with navigation enabled as described above.

The foregoing objects are believed to be satisfied by the embodiments of the present invention as described below.

DETAILED DESCRIPTION OF THE INVENTION

The typical invention use scenario begins with the user starting a web browser providing a graphical user interface, and then specifying features such as keywords or search terms that are of interest. The graphical user interface may for example be generated by a digital computer, a personal digital assistant, a personal information manager, or a microbrowser application running on a cellular telephone. A search engine provides links to documents that it discovers and deems relevant based on an analysis of the instances of search terms found in such documents. Search engines are generally known in the art and are readily familiar to persons looking for information in digital data stored in networks like the Internet. Search engines often provide metadata describing the discovered relevant documents; this metadata routinely includes the documents' URLs, overall size, date, the first sentence from the document (or its header if not a text document), and a relevance ranking. Documents may include text files, image files, audio files, and video files for example, as well as collections. A multimedia analysis and indexing tool, such as IBM's CueVideo toolkit, may also generate document metadata beyond that provided by the search engine, particularly for multimedia documents. For example, document metadata may include search terms, a textual transcript, the results of a textual transcript search, the results of a speaker change search, the results of a stress analysis, topic headings, the results of a topic change search, the results of a speech transcript search, audio features, the audio amplitude data, and the number of accesses to a particular document segment.

Figure 2:
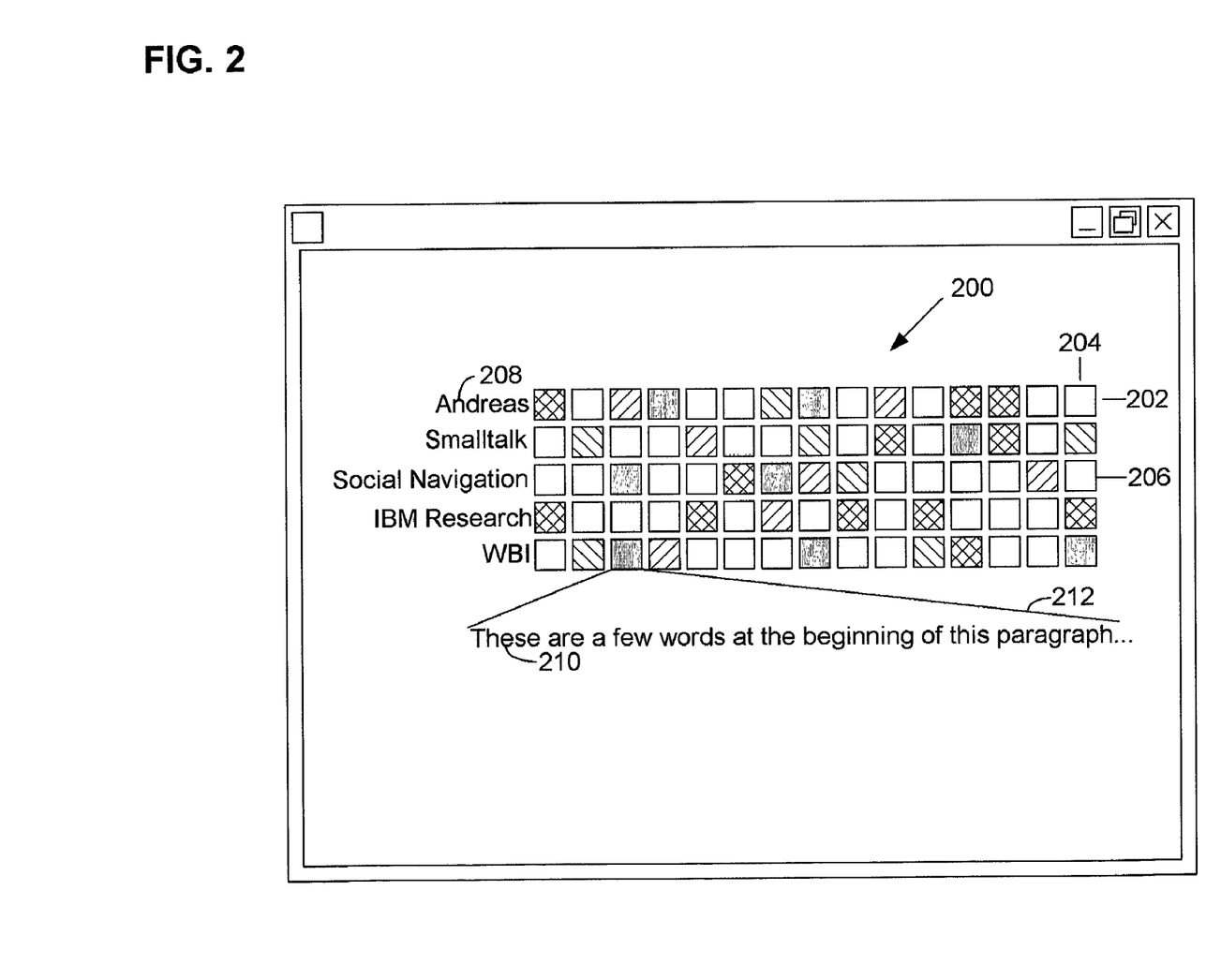
FIG. 2 is a diagram of the summary view of the first embodiment of the present invention.

Referring now to FIG. 2, a diagram of the summary view of the first embodiment of the present invention is shown. Summary view 200 is a condensed abstract representation of at least one of the documents a user wishes to visualize and navigate. A Java applet can generate summary view 200 from the document itself, or from the document metadata, or both. Summary view 200 depicts the structure of the document, as well as the distribution and frequency of search terms within the document's various segments (which may be defined by an indexing tool or merely represent a straightforward segmentation of the document). In FIG. 2, the segments shown all have the same size, but this depiction is not limiting; the visualization could show the segment size by varying the cell size. The distribution and frequency information define a search term density distribution that a user would find useful when deciding whether to view and navigate a particular document's content. Other useful relevance measures can also be depicted by summary view 200. In the first embodiment, summary view 200 comprises rows 202, columns 204, and cells 206 in a rectangular array. In this embodiment, rows 202 correspond to the user-specified search terms, and columns 204 correspond to segments of the document. Search terms 208 are displayed to help remind the user of row 202 meanings, helping to keep the user oriented and within the context of the information retrieval effort. The content of each cell 206 represents for example the frequency with which a particular search term 208 occurs in the portion of the document represented by that particular cell 206. The relative darkness of each cell 206, for example, depicts the density of each search term 208. Alternately, different colors may be assigned to represent different densities according to a color legend. The physical dimensions of summary view 200 and its separate components may also encode metadata; for example, search terms 208 not occurring frequently anywhere in the document may be represented by thin corresponding rows 202.

According to the present invention, when the user moves a cursor (not shown) in the graphical user interface near or over a particular cell 206, an enhancement 210 is responsively displayed. The juxtaposition of a cursor near or on a graphical user interface target is termed "brushing" and is distinct from selection of that target by clicking a mouse button. Enhancement 210 is an addition to summary view 200 providing more detailed information. In this embodiment, enhancement 210 includes a few words at the beginning of the paragraph (e.g. a text document segment). Guide lines 212 help the user stay in context by unobtrusively identifying the particular cell 206 to which enhancement 210 corresponds. Highlighting of a cell 206 boundary in response to cursor proximity accomplishes a similar effect.

Figure 3:
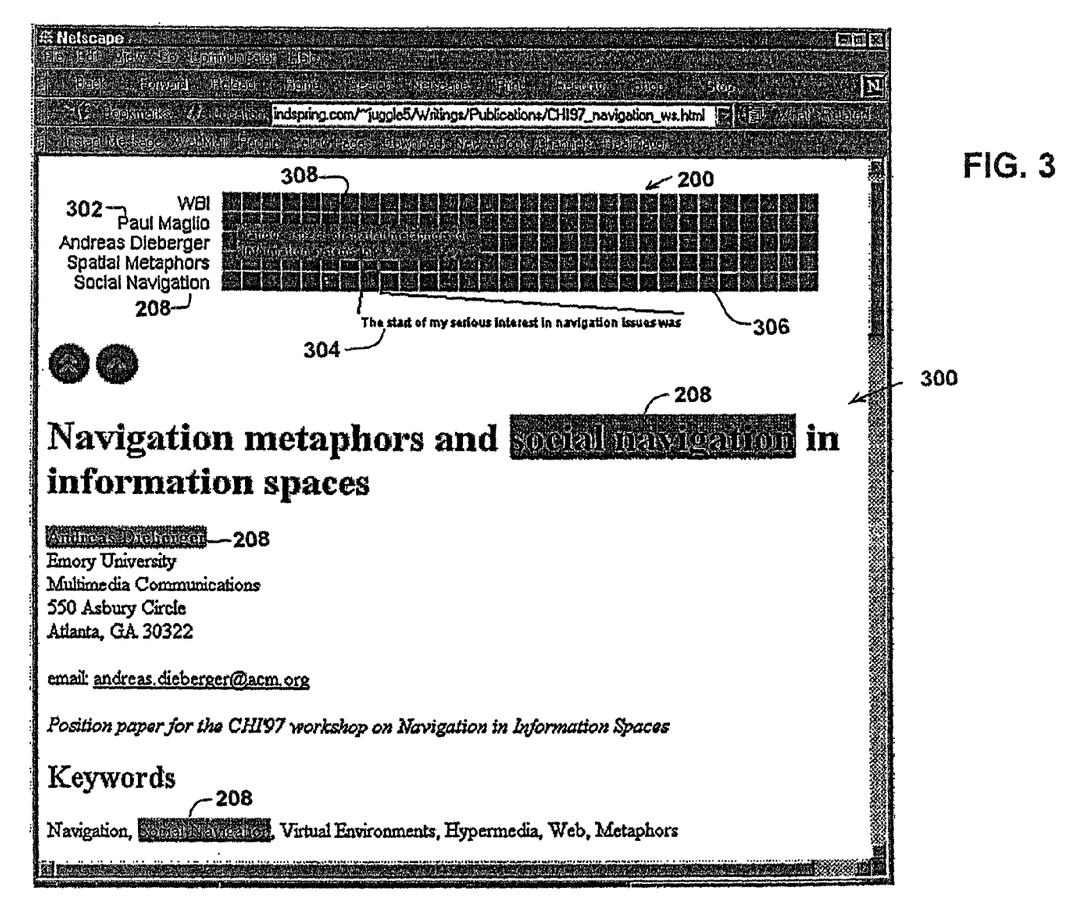
FIG. 3 is a display of the summary view of the first embodiment of the present invention within a modified version of a document.

Referring now to FIG. 3, a display of summary view 200 of the first embodiment of the present invention is shown. In this case, document 300 is a web page that has been modified, for example, to include a Java applet to generate summary view 200 therein. Search terms 208 are highlighted throughout the document to help reinforce the intuitive relationship between document 300 content and summary view 200. Enhancement 304 includes not only a few words at the beginning of the paragraph represented by a particular cell 306, but also includes a contextual snippet 308. Contextual snippet 308 includes a particular search term 302 and several surrounding words from the particular portion of document 300 represented by cell 306, to help the user determine how search term 302 relates to nearby document 300 content. Contextual snippet 308 is displayed in response to cursor brushing that triggers enhancement 304.

A user may therefore determine the context in which search terms 302 occur in a document via summary view 200. If the user then decides that the instance of search term 302 is likely to be of interest, then the user can navigate directly to that instance in the document by selecting the corresponding particular cell 306. For example, when the user clicks a mouse button to select a particular cell 306, the invention scrolls the document so that the portion of the document corresponding to that particular cell 306 is directly displayed. The present invention therefore does not rely on the use of conventional scrolling techniques as practiced with conventional web browsing programs for document navigation, although the invention is likely be used with web browsers.

Figure 4:
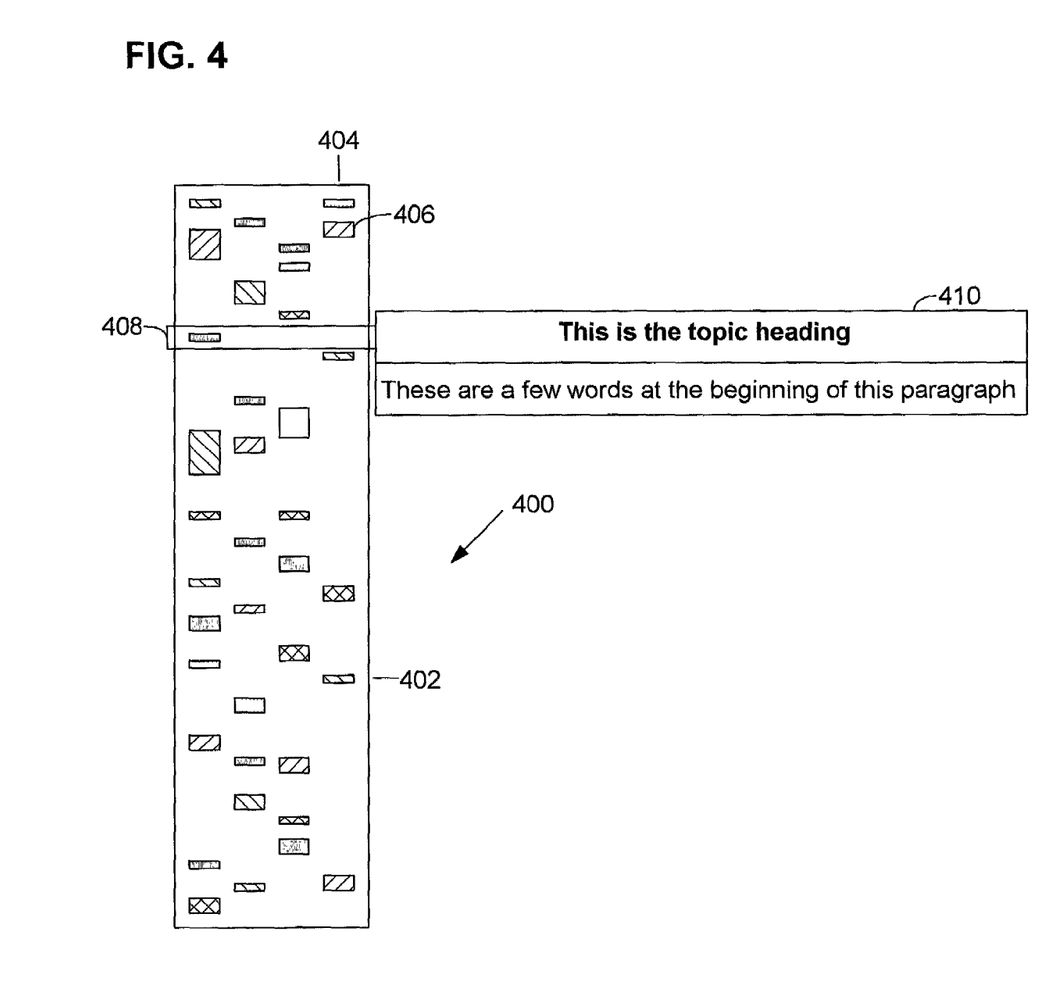
FIG. 4 is a diagram of the summary view of the preferred embodiment of the present invention as a fold-out window.

Referring now to FIG. 4, a diagram of summary view 400 of the preferred embodiment of the present invention as a fold-out window is shown. In this embodiment, the document (not shown) is not modified to include a summary view 400 within the document itself as in the first embodiment. Instead, the visualization and navigation tool of the present invention generates the fold-out window that floats over the document in the graphical user interface. Rows 402 correspond to segments of the document, and columns 404 correspond to search terms 208. In other words, summary view 400 is substantially vertically oriented to more intuitively correspond to a top-down document depiction and navigation scheme. As with the first embodiment, cells 406 correspond to particular search terms 208 occurring in particular portions of the document; however, in the preferred embodiment, cells 406 appear ONLY where search terms 208 occur, i.e. cell 406 boundaries are removed to prevent user confusion. Cells 406 resemble the bands that appear in electrophoretic autoradiographs used for genetic analyses, so summary views 400 are intuitively very familiar to those who have seen such depictions of DNA. Summary view 400 provides an immediate overview of the document as well as the distribution of interesting expressions throughout the document as an exemplary indication of document relevance. A slider 408 helps the user identify particular document segments, and appears in response to cursor brushing of a particular row 402. Enhancement 410 appears in response to at least one cell 406, and in this Figure comprises a topic heading and the first sentence of text under that heading.

Figure 5A:
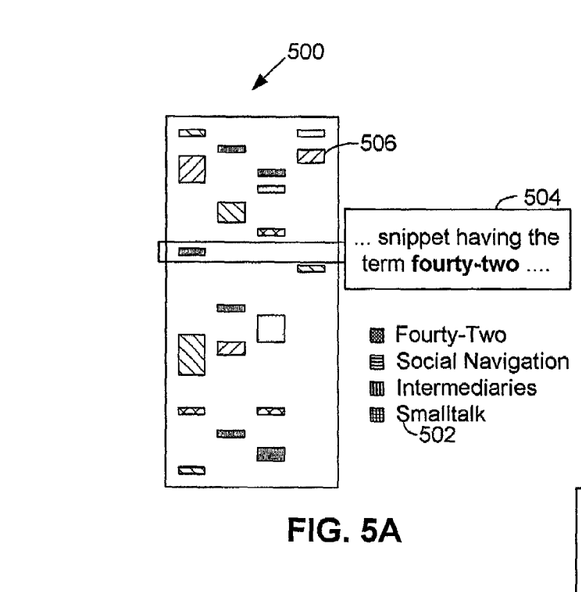
FIGS. 5A, 5B, and 5C are diagrams of the summary view of the preferred embodiment of the present invention including a listing of search terms and a contextual snippet.
Figure 5B:
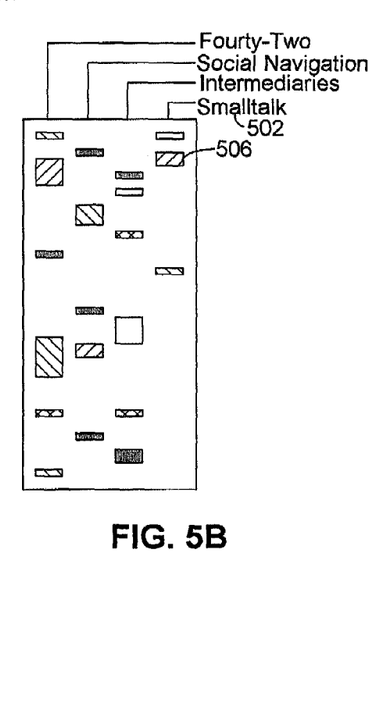
Figure 5C:
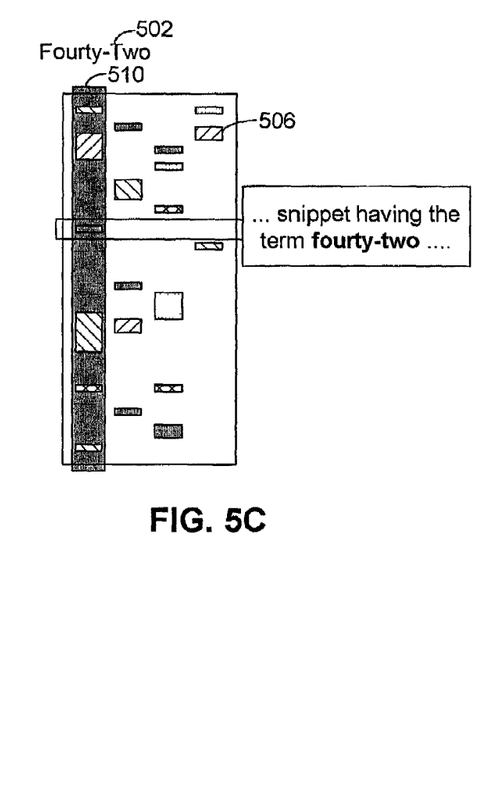

Referring now to FIG. 5A, a diagram of summary view 500 of the preferred embodiment of the present invention including a listing of search terms 502 and a contextual snippet 504 is shown. Search terms 502 are displayed in colors or near colored bars corresponding to cell 506 color to help the user maintain context. For hardware platforms that are not capable of displaying a color graphical user interface, sets of bars and cells 506 sharing common individual texture patterns can still help the user relate cells 506 to their corresponding search terms 502. Instances of search terms 508 can be highlighted (e.g. "forty-two") for example when an adjustable relevance threshold is exceeded. Alternately, as shown in FIG. 5B, search terms 502 may be staggered and visually linked to corresponding columns with leading lines. The invention thus operates to avoid distraction and confusion for users who are accustomed to conventional web browser use, and may be of particular utility with computer systems that have limited display capabilities. As with the first embodiment, a user may select a particular cell 506 and navigate to its corresponding document portion directly, without relying on scrolling. Yet another way of identifying search terms 502 corresponding to particular cells 506 being brushed is depicted in FIG. 5C. Search terms 502 are shown only when a corresponding cell 506 is brushed, and a highlighter 510 denotes the column containing such a cell 506. Highlighter 510 may comprise a differently colored or shaded region, or the outline of a column. Alternately (not shown), search terms 502 may be shown in small fonts except for the particular search term 502 corresponding to highlighter 510, which is shown in a larger font so that as different cells 506 are brushed the corresponding search terms 502 are temporarily enlarged in a magnifying-glass effect. Search terms 502 and highlighter 510 may be depicted in any of the manners described above as the user traverses through a hierarchy of summary views.

Figure 6A:
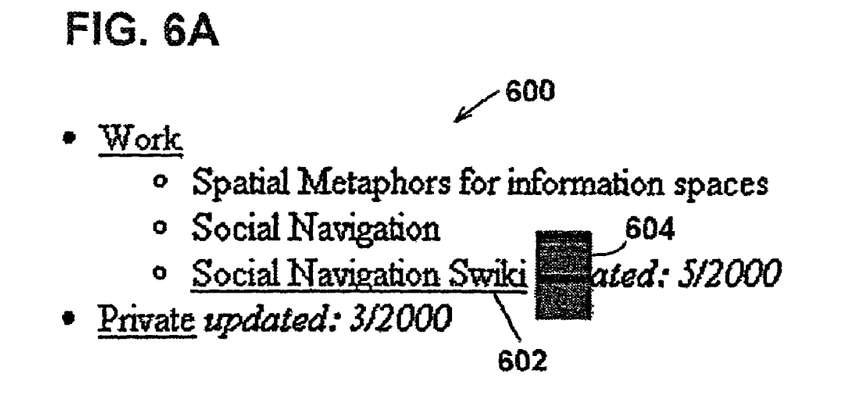
FIGS. 6A, 6B, and 6C are displays of the summary view of the preferred embodiment of the present invention depicting a hierarchy of fold-out windows including previews or indications of the distribution of search terms in linked documents.
Figure 6B:
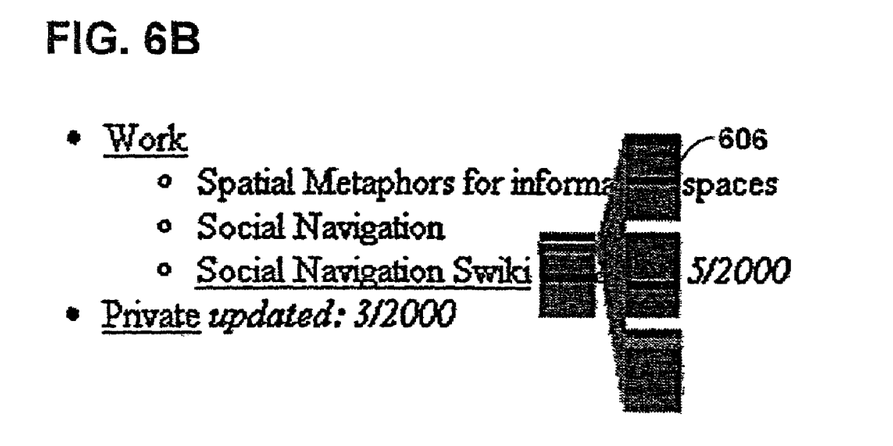
Figure 6C:
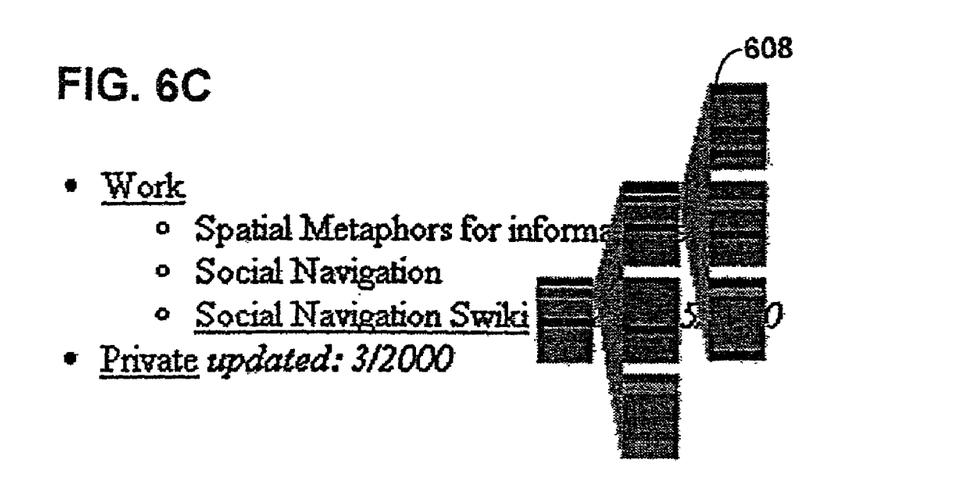

Referring now to FIGS. 6A, 6B, and 6C, displays of the summary view of the preferred embodiment of the present invention depicting a hierarchy of fold-out windows is shown. Each fold-out window in the hierarchy can depict increasingly detailed information about portions of a document, until finally a particular portion of the document is directly displayed. In these figures, document 600 comprises five lines from a web page. The link "Social Navigation Swiki" 602 is in document 600 being displayed, but link 602 points to another document. By brushing a cursor over link 602, the user triggers an enhancement, e.g. in FIG. 6A this enhancement is a first fold-out window 604.

In this non-limiting example of the use of a summary view hierarchy, indications of the distribution of search terms 208 in a linked-to document are shown. Fold-out window 604 depicts summary information about the linked-to document without requiring that the linked-to document be pre-fetched in its entirety, because only the metadata of the linked-to document is required. In other words, only the linked-to document's summary view is needed. The present invention is therefore of particular utility with computer systems having limited storage and communication capability.

The summary information may include for example a thumbnail or contextual snippet of the linked-to document, or a depiction of the linked-to document's search term density distribution. The summary information may also include a description of the number of accesses that have been made to the linked-to document or portions thereof. For example, the darkness of cells in first fold-out window 604 can correspond to the popularity of a document portion. The user can therefore choose whether to select and navigate to a linked-to document based solely on the summary information.

FIG. 6B depicts a further enhancement via a second fold-out window 606, and FIG. 6C depicts an even further enhancement via a third fold-out window 608. These further enhancements may comprise depictions of different types of summary information about the same linked-to document, or may comprise summary views of a hierarchy of linked-to documents.

Figure 7A:
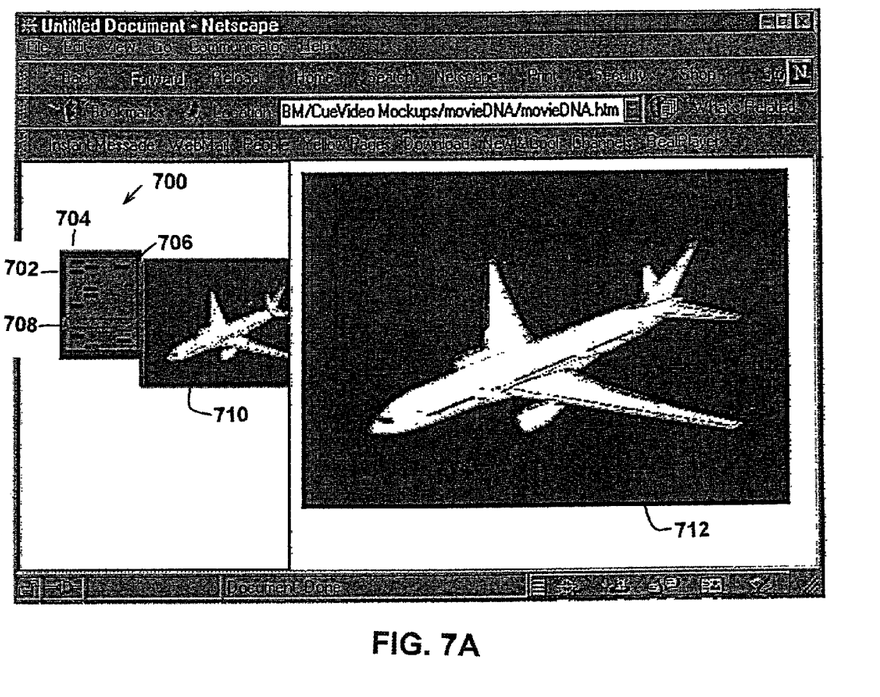
FIGS. 7A and 7B are displays of the summary view of the third embodiment of the present invention with a video document.
Figure 7B:
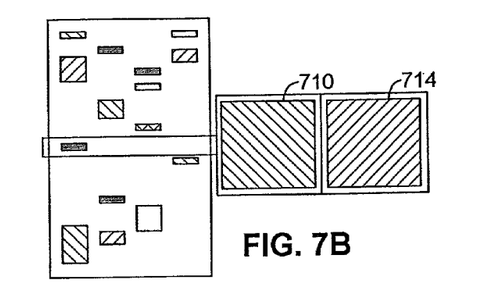

Referring now to FIG. 7A, a display of the summary view 700 of a third embodiment of the present invention with a video document is shown. Video documents are examples of often-large documents having a large amount of linear data, by which it is meant that such documents cannot be readily summarized at a single glance. Other examples include long text files, audio files, and document collections. Summary view 700 includes rows 702, columns 704, cells 706, and a slider 708 as with the preferred embodiment. Rows 702 correspond to segments of the video document as may be selected by a segmentation tool. However, the enhancement triggered by brushing a particular row 702 in this embodiment is a video frame 710 from the video document corresponding to the segment of video data represented by cell 706. When the user selects a particular row 702 or video frame 710, the invention navigates to the corresponding segment in the video data and begins playing the video in a document display 712 at the beginning of the selected segment. As shown in FIG. 7B, more than one type of enhancement can be triggered. For example, in addition to video frame 710, a slide 714 can be shown. The video frame 710 could depict a speaker giving a slide presentation.

Figure 8:
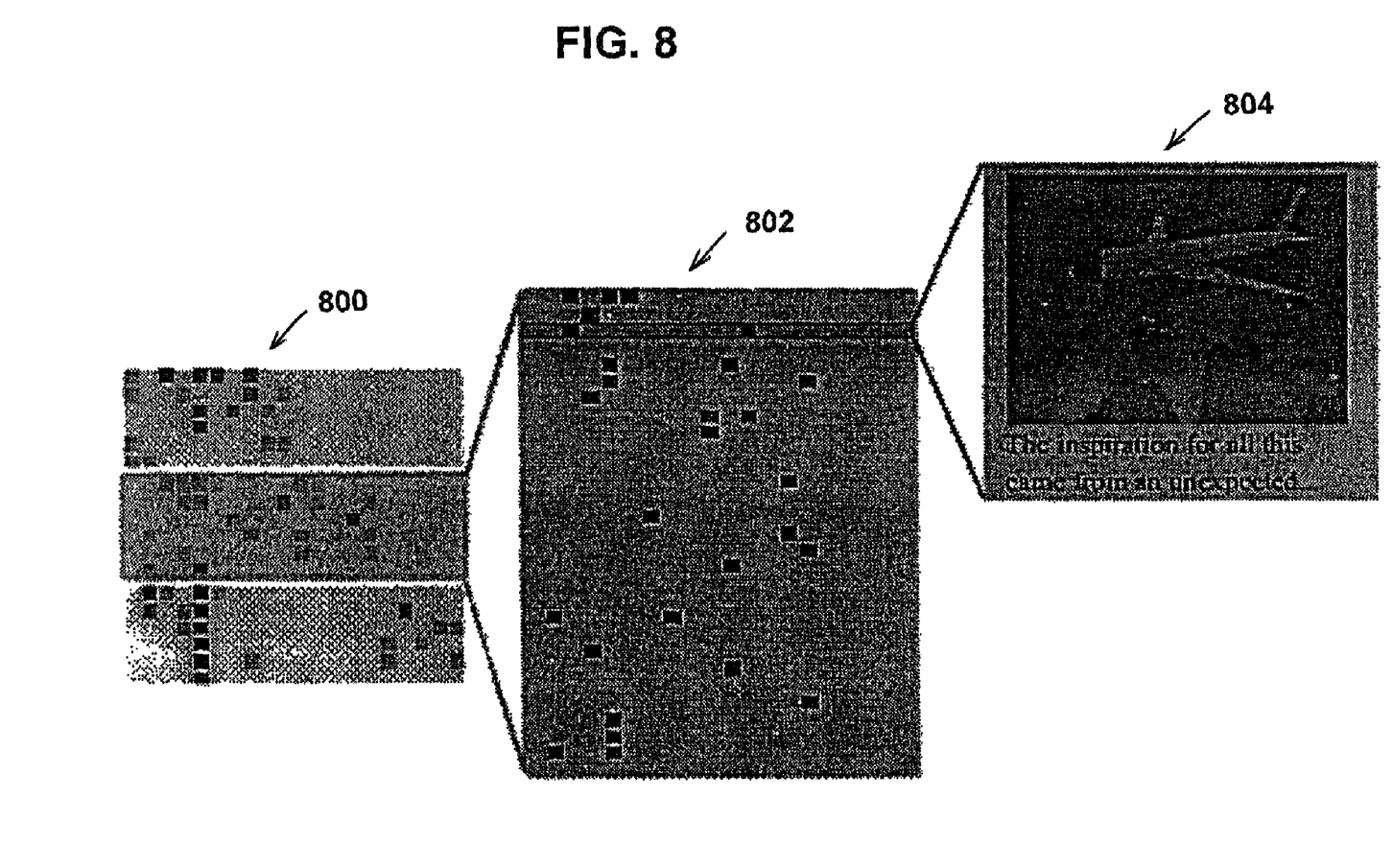
FIG. 8 is a diagram of the summary view of the third embodiment of the present invention depicting a hierarchy of fold-out windows.

Referring now to FIG. 8, a diagram of the summary view of the third embodiment of the present invention depicting a hierarchy of fold-out windows is shown. First hierarchical window 800 is the now-familiar summary view of a video file or a collection of video files. Second hierarchical window 802, triggered by brushing a row in first hierarchical window 800, is the summary view of a number of rows of first hierarchical window 800. For example, if first hierarchical window 800 depicts a summary view of a video collection, second hierarchical window 802 may depict a summary view of a single video in the collection. A third hierarchical window 804, triggered by brushing a row in second hierarchical window 802, is the summary view of the brushed row. In this example, third hierarchical window 804 depicts a video frame and the first sentence from an audio transcript corresponding to the beginning of the document segment represented by the brushed row. The user can begin playing the video at this point by selecting third hierarchical window 804.

Figure 9:
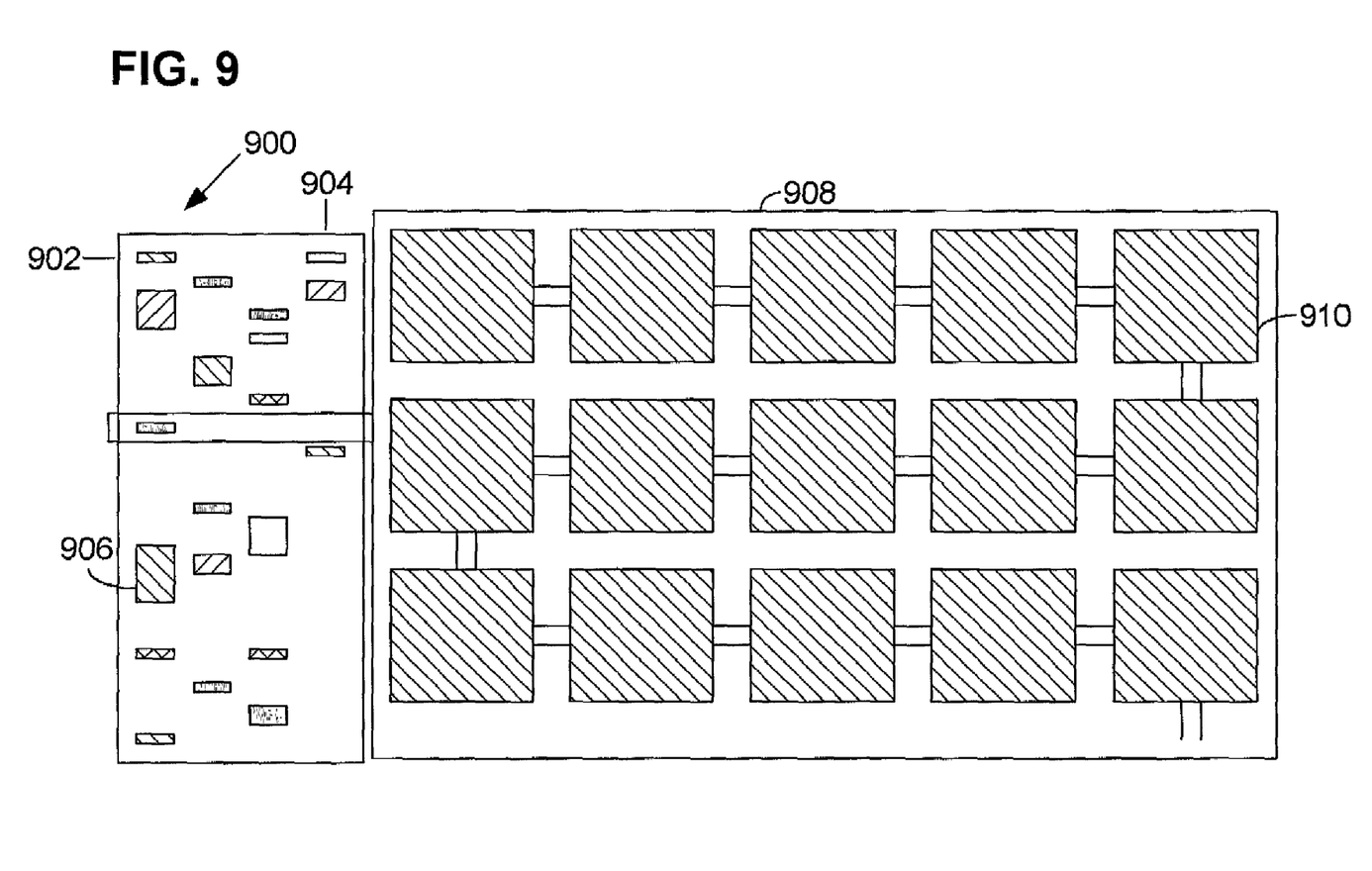
FIG. 9 is a diagram of the summary view of the fourth embodiment of the present invention including a storyboard depiction of the video document.

Referring now to FIG. 9, a diagram of the summary view of the fourth embodiment of the present invention including a storyboard depiction of the video document is shown. This embodiment is similar to the third embodiment, but the enhancement to summary view 900 with its rows 902, columns 904, and cells 906 comprises a storyboard 908 comprising a number of video frames 910 in a hierarchy of summary views having at least one level. In this example, video frames 910 are interconnected in a serpentine fashion, to help the user maintain context more effectively as different rows 902 are brushed and, in response, visualized. The user can navigate even a very long video by brushing rows 902 and video frames 910 to reach a particular video frame 910 to be selected and played.

Figure 10:
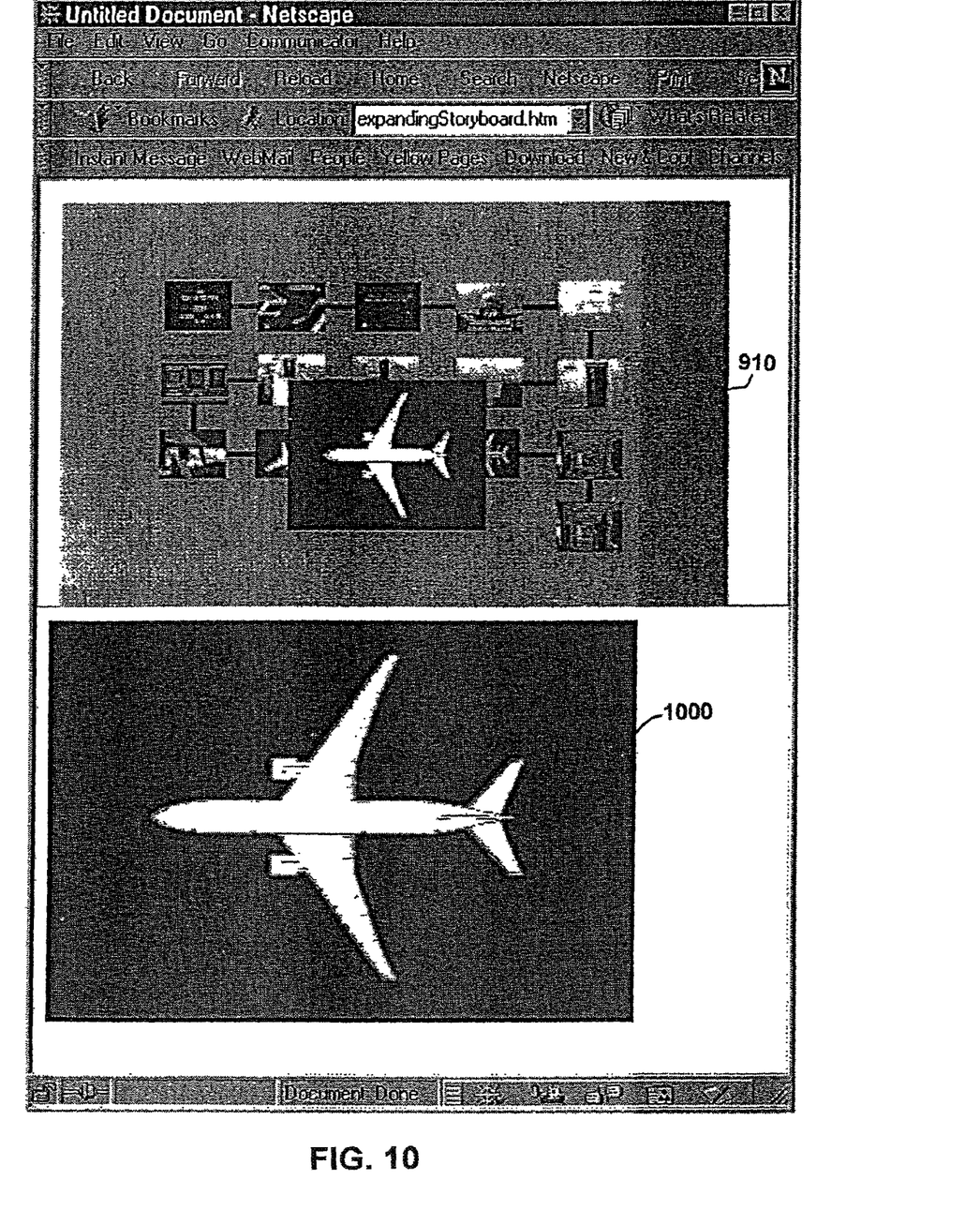
FIG. 10 is a display of the summary view of the fourth embodiment of the present invention including a storyboard depiction of the video document.

Referring now to FIG. 10, a display of the summary view of the fourth embodiment of the present invention including a storyboard depiction of the video document is shown. As described above with respect to FIG. 9, a particular video frame 910 is selected and play begins at a corresponding point in the video document in document display 1000.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the invention has been described with respect to an illustrative embodiment thereof, it will be understood that various changes may be made in the apparatus and means herein described without departing from the scope and teaching of the invention. Accordingly, the described embodiment is to be considered merely exemplary and the invention is not to be limited except as specified in the attached claims.

We claim:

1. A method for visualizing and navigating documents in a graphical user interface comprising:

generating a summary view of at least one document containing instances of search terms using a condensed abstract representation depicting a search term density distribution;

triggering an enhancement of said summary view by cursor brushing; and navigating to at least one segment of said document by selecting a corresponding portion of said summary view;

generating document metadata including at least one of: results of a speaker change search, results of a stress analysis, results of a speech transcript search, audio features, audio amplitude data, number of accesses to a particular document segment; and depicting said search term density distribution using said document metadata.

2. A system for visualizing and navigating documents in a graphical user interface comprising:

means for generating a summary view of at least one document containing instances of search terms using a condensed abstract representation depicting a search term density distribution;

means for triggering an enhancement of said summary view by cursor brushing; and means for navigating to at least one segment of said document by selecting a corresponding portion of said summary view;

means for generating document metadata including at least one of: results of a speaker change search, results of a stress analysis, results of a speech transcript search, audio features, audio amplitude data, number of accesses to a particular document segment; and means for depicting said search term density distribution using said document metadata.

* * * * *